United States Patent
Zhang et al.

(10) Patent No.: US 10,933,299 B2
(45) Date of Patent: Mar. 2, 2021

(54) ELECTRIC POWER-DRIVEN SHOE

(71) Applicant: Nimbus Robotics, Inc., Pittsburgh, PA (US)

(72) Inventors: Jiancheng Zhang, JiangBei NingBo (CN); Bojie Xu, JiangBei NingBo (CN); Jianjun Li, JiangBei NingBo (CN); Dongliang Song, JiangBei NingBo (CN)

(73) Assignee: Nimbus Robotics, Inc., Pittsburgh, PA (US)

( * ) Notice: Subject to any disclaimer, the term of this patent is extended or adjusted under 35 U.S.C. 154(b) by 0 days.

(21) Appl. No.: 16/346,862

(22) PCT Filed: Aug. 3, 2017

(86) PCT No.: PCT/CN2017/000502
§ 371 (c)(1),
(2) Date: May 1, 2019

(87) PCT Pub. No.: WO2018/082195
PCT Pub. Date: May 11, 2018

(65) Prior Publication Data
US 2020/0061445 A1   Feb. 27, 2020

(30) Foreign Application Priority Data
Nov. 1, 2016   (CN) .......................... 2016 1 0936080

(51) Int. Cl.
| A63C 17/26 | (2006.01) |
| A63C 17/02 | (2006.01) |
| B62D 57/032 | (2006.01) |

(52) U.S. Cl.
CPC .............. *A63C 17/26* (2013.01); *A63C 17/02* (2013.01); *B62D 57/032* (2013.01)

(58) Field of Classification Search
CPC ..................................................... A63C 17/12
See application file for complete search history.

(56) References Cited

U.S. PATENT DOCUMENTS

| 833,100 | A | * | 10/1906 | Wells | A63C 17/12 280/11.115 |
| 1,672,700 | A | * | 6/1928 | Vass | A63C 17/02 280/11.31 |

(Continued)

FOREIGN PATENT DOCUMENTS

| CN | 2759524 Y | 2/2006 |
| CN | 201423154 Y | 3/2010 |

(Continued)

OTHER PUBLICATIONS

International Search Report and Written Opinion for PCT/CN2017/000502 dated Oct. 13, 2017.

(Continued)

*Primary Examiner* — Erez Gurari
(74) *Attorney, Agent, or Firm* — Troutman Pepper Hamilton Sanders LLP

(57) ABSTRACT

Disclosed is a bionic electric power-driven shoe, comprising a shoe sole (1), wherein a plurality of rotating wheels (2) are arranged below the shoe sole (1); an electric motor (3) is further provided at a lower part of the shoe sole (1); an output end of the electric motor (3) is connected to a transmission device in driving connection with the rotating wheels (2); and the shoe sole (1) comprises a heel part (11) and a sole part (12), the heel part (11) and the sole part (12) being in rotational connection.

7 Claims, 2 Drawing Sheets

(56) References Cited

U.S. PATENT DOCUMENTS

| | | | | |
|---|---|---|---|---|
| 1,801,205 A * | 4/1931 | Mirick | A63C 17/0046 | 280/11.215 |
| 2,857,008 A * | 10/1958 | Pirrello | A63C 17/12 | 180/181 |
| 3,392,986 A * | 7/1968 | Ryan | A63C 17/12 | 280/11.115 |
| 4,334,690 A * | 6/1982 | Klamer | A63C 17/1436 | 188/82.7 |
| 4,417,737 A * | 11/1983 | Suroff | A63C 17/12 | 280/11.115 |
| 4,553,767 A * | 11/1985 | Robjent | A63C 17/1454 | 188/82.3 |
| RE32,346 E | 2/1987 | Klamer | A63C 17/1454 | 188/82.7 |
| 4,932,676 A * | 6/1990 | Klamer | A63C 17/1454 | 188/82.3 |
| 5,056,802 A * | 10/1991 | Piotrowski | A63C 17/12 | 280/11.115 |
| 5,236,058 A * | 8/1993 | Yamet | A63C 17/12 | 180/181 |
| 5,400,484 A * | 3/1995 | Gay | A44B 11/20 | 24/593.11 |
| 5,730,241 A * | 3/1998 | Shyr | A63C 17/10 | 180/181 |
| 5,797,466 A * | 8/1998 | Gendle | A63C 17/265 | 180/181 |
| 6,059,062 A * | 5/2000 | Staelin | A63C 17/12 | 180/181 |
| 6,322,088 B1 * | 11/2001 | Klamer | A63C 17/02 | 280/11.27 |
| 6,497,421 B1 * | 12/2002 | Edgerley | A43B 3/26 | 280/11.19 |
| 6,517,091 B1 * | 2/2003 | Fisher | A63C 1/26 | 280/11.26 |
| 6,645,126 B1 | 11/2003 | Martin et al. | | |
| 7,163,210 B1 * | 1/2007 | Rehkemper | A63C 17/12 | 280/11.221 |
| 7,204,330 B1 * | 4/2007 | Lauren | A63C 17/12 | 180/181 |
| 8,672,074 B2 * | 3/2014 | Ganeous | A63C 17/10 | 180/181 |
| 9,295,302 B1 | 3/2016 | Reed et al. | | |
| 9,925,453 B1 * | 3/2018 | Tuli | A43B 3/0005 | |
| 10,456,698 B2 * | 10/2019 | Chen | A63H 19/10 | |
| 2001/0022433 A1 * | 9/2001 | Chang | A43B 5/1633 | 280/11.19 |
| 2003/0047893 A1 * | 3/2003 | Pahis | A63C 17/12 | 280/11.115 |
| 2003/0141124 A1 * | 7/2003 | Mullet | A63C 17/12 | 180/181 |
| 2004/0239056 A1 * | 12/2004 | Cho | A63C 17/008 | 280/7.1 |
| 2005/0046139 A1 * | 3/2005 | Guan | A63C 17/12 | 280/221 |
| 2006/0027409 A1 * | 2/2006 | Adams | A63C 17/008 | 180/181 |
| 2007/0090613 A1 * | 4/2007 | Lyden | A63C 17/02 | 280/11.221 |
| 2007/0273110 A1 * | 11/2007 | Brunner | A63C 17/12 | 280/11.115 |
| 2009/0120705 A1 * | 5/2009 | McKinzie | A63C 17/008 | 180/181 |
| 2012/0285756 A1 | 11/2012 | Treadway | | |
| 2013/0025955 A1 * | 1/2013 | Chavand | A63C 17/12 | 180/181 |
| 2013/0123665 A1 | 5/2013 | Mariani et al. | | |
| 2013/0274640 A1 | 10/2013 | Butters et al. | | |
| 2014/0196757 A1 | 7/2014 | Goffer | | |
| 2015/0196403 A1 | 7/2015 | Kim et al. | | |
| 2016/0045385 A1 | 2/2016 | Aguirre-Ollinger et al. | | |
| 2016/0113831 A1 | 4/2016 | Hollander | | |
| 2016/0250094 A1 | 9/2016 | Amundson et al. | | |
| 2016/0331557 A1 | 11/2016 | Tong et al. | | |
| 2017/0055880 A1 | 3/2017 | Agrawal et al. | | |
| 2017/0181917 A1 | 6/2017 | Ohta et al. | | |
| 2017/0182397 A1 * | 6/2017 | Zhang | A63C 17/12 | |
| 2017/0259811 A1 | 9/2017 | Coulter et al. | | |
| 2017/0296116 A1 | 10/2017 | McCarthy et al. | | |
| 2019/0314710 A1 * | 10/2019 | Zhang | A63C 17/04 | |
| 2019/0351315 A1 * | 11/2019 | Li | A63C 17/08 | |
| 2020/0061444 A1 * | 2/2020 | Zhang | A63C 17/0006 | |
| 2020/0061445 A1 | 2/2020 | Zhang et al. | | |
| 2020/0129843 A1 | 4/2020 | Zhang et al. | | |
| 2020/0129844 A1 | 4/2020 | Zhang et al. | | |

FOREIGN PATENT DOCUMENTS

| | | |
|---|---|---|
| CN | 201565096 U | 9/2010 |
| CN | 101912680 A | 12/2010 |
| CN | 101912681 A | 12/2010 |
| CN | 102167117 A | 8/2011 |
| CN | 102805928 A | 12/2012 |
| CN | 203389316 U | 1/2014 |
| CN | 104689559 A | 6/2015 |
| CN | 204364838 U | 6/2015 |
| CN | 204395401 U | 6/2015 |
| CN | 105214299 A | 1/2016 |
| CN | 106039689 A | 10/2016 |
| CN | 205627021 U | 10/2016 |
| CN | 106390428 A | 2/2017 |
| CN | 106390430 A | 2/2017 |
| CN | 106582003 A | 4/2017 |
| EP | 0686412 A2 | 12/1995 |
| EP | 0834337 A2 | 4/1998 |
| EP | 0894515 A1 | 2/1999 |
| EP | 3629925 A1 | 4/2020 |
| JP | 2005-81038 A | 3/2005 |
| WO | 2018082192 A1 | 5/2018 |
| WO | 2018082193 A1 | 5/2018 |
| WO | 2018082194 A1 | 5/2018 |
| WO | 2018082195 A1 | 5/2018 |
| WO | 2019014152 A1 | 1/2019 |
| WO | 2019014154 A1 | 1/2019 |
| WO | 2019212995 A1 | 11/2019 |

OTHER PUBLICATIONS

International Search Report and Written Opinion for PCT/CN2017/000499 dated Oct. 20, 2017.
International Search Report and Written Opinion for PCT/CN2017/000501 dated Nov. 3, 2017.
International Search Report and Written Opinion for PCT/US2018/041343 dated Sep. 7, 2018.
International Search Report and Written Opinion for PCT/US2018/041345 dated Sep. 7, 2018.
International Search Report and Written Opinion for PCT/US2019/029742 dated Aug. 26, 2019.
International Search Report and Written Opinion for PCT/CN2017/000500 dated Oct. 20, 2017.

* cited by examiner

ELECTRIC POWER-DRIVEN SHOE

TECHNICAL FIELD

The present application relates to bionic electric power shoes, and belongs to the technical field of transportation tools.

BACKGROUND ART

With the further growth of the urban population, traffic jam has become the nuisance of every main city. Although public transportation is a very effective solution to the traffic jam, a last kilometer problem, that is, a relatively long final walking distance, still remains, which is one of the factors hindering the building of a perfect bus system. Therefore, there are various electric transportation tools on the market, such as electric roller skates, which are the solutions to the last kilometer problem.

However, all the existing electric roller skates have one problem that their shoe soles are non-bendable and in one piece, so that a user cannot keep a normal walking posture (namely a gait cycle from heels touching the ground to forefoot parts pedaling the ground) when wearing this type of electric roller skates. In face of complicated urban roads, such as switching sidewalks and striding puddles, the user cannot walk normally, which means that the practicability of this technology is greatly reduced, and the electric roller skates become game tools to a certain extent. On the other hand, it is relatively hard for people to master the use of this type of electric roller skates, and only those who have certain roller skating experience can be skillful at using them, so that the popularization and use range is relatively small.

SUMMARY OF THE INVENTION

In view of the shortcomings in the prior art, the present application provides bionic electric power shoes capable of keeping a normal walking posture during use.

In order to solve the above-mentioned problem, the present application provides the following technical solution: bionic electric power shoes, each of which includes a shoe sole. A plurality of rotating wheels are disposed below the shoe sole, and a motor is further disposed at the lower part of the shoe sole; and the output end of the motor is connected with a transmission device which is in driving connection with the rotating wheels. Each bionic electric power shoe is characterized in that the shoe sole consists of a shoe heel part and a shoe forefoot part. The shoe heel part and the shoe forefoot part are in rotatable connection with each other.

In the present application, because the shoe heel parts and the shoe forefoot parts may rotate relatively to accord with the walking posture that a user first lifts up heels and then forefoot parts during walking, the user can keep a normal walking posture during use of the present application, and master the use of the present application more easily. Moreover, the present application may be suitable for complicated urban roads, such as switching sidewalks and striding puddles, and its practicability is greatly improved.

In order to achieve a better technical effect, a further technical measure also includes that: first rotating wheel racks are disposed on two sides below the shoe heel part; two middle wheels and two rear wheels are respectively disposed at the front and rear parts of the first rotating wheel racks; the middle wheels are located below a boundary position between the shoe heel part and the shoe forefoot part; second rotating wheel racks are disposed below the shoe forefoot part; and two front wheels are arranged on the second rotating wheel racks. By the structure, the user can keep at least four rotating wheels on the ground no matter if the shoe heels are on or off the ground during walking, so as to guarantee their stability and improve their walking safety on the road.

The shoe forefoot part and the shoe heel part are connected only through a rotating structure. In the process that the shoe heel is lifted up during walking, the rotating structure bears a relatively high pressure, and may deform easily after a long walk, resulting in inflexible relative rotation between the shoe forefoot part and the shoe heel part. In addition, in the above-mentioned process, if the shoe heel is lifted up too much to enable the middle wheels to get off the ground alone, on one hand, the stability would be reduced, and on the other hand, the front wheels would bear a relatively high pressure to greatly shorten the service lives of the second rotating wheel racks. Therefore, a further improvement is that: the second rotating wheel racks extend towards the middle wheels to form connection parts, on which arc-shaped holes are formed; the middle wheels are disposed on the first rotating wheel racks through a first rotating shaft which penetrates through the arc-shaped holes; and when the shoe heel part and the shoe forefoot part rotate relatively, the first rotating shaft moves along the arc-shaped holes. In this solution, as the arc-shaped holes are connected with the first rotating shaft, when the shoe heel is lifted up, the arc-shaped holes would assist the rotating structure in sharing part of the pressure, thus prolonging the service life of the rotating structure. Furthermore, when the shoe heel is lifted up to a certain extent, if the middle wheels get off the ground, sheet-like bodies would drive the front wheels to get off the ground at the same time due to the barrier effects of the end parts of the arc-shaped holes, thereby avoiding this phenomenon that the middle wheels get off the ground alone, ensuring that there are always four rotating wheels in contact with the ground, and guaranteeing the walking stability; and on the other hand, the front wheels may not bear the pressure alone, thereby, prolonging the service lives of the second rotating wheel racks.

Further, the edges of the arc-shaped holes outwards extend to enable the depths of the arc-shaped holes to be greater than the thicknesses of the sheet-like bodies. The objective of this structure is to enlarge the contact area of the arc-shaped holes and the first rotating shaft and improve the sliding smoothness of the first rotating shaft in the arc-shaped holes.

Further, a plurality of holes are formed in the sheet-like bodies. This mechanism can reduce the weight of a shoe body, and relieve the burden on people during walking to make walking easier.

In order to achieve a better technical effect, further, the wheel tread of the rear wheels is less than that of the middle wheels. In this solution, the transverse steadiness is improved, and collision between the forefoot part of one shoe and the heel of the other shoe during walking due to an extremely large wheel tread is avoided.

In order to achieve a better technical effect, further, the middle wheels and the rear wheels are both connected with the output end of the motor through the transmission device. In this solution, the two groups of rotating wheels, namely the middle wheels and the rear wheels, are simultaneously driven, so that when the rear wheels are lifted up, the middle wheels may still provide forward moving power.

Compared with the prior art, the present application has the following beneficial effects that: because the shoe heel parts and the shoe forefoot parts may rotate relatively to accord with the walking posture that the user first lifts up the heels and then the forefoot parts during walking, the user can keep the normal walking posture during use of the present application, and master the use of the present application more easily. Moreover, the present application may be suitable for complicated urban roads, such as switching sidewalks and striding puddles, and its practicability is greatly improved.

DETAILED DESCRIPTION OF THE INVENTION

A further detailed description will be made below to the present application in combination with accompanying drawings and specific implementation modes.

Embodiment 1

Figure 1:
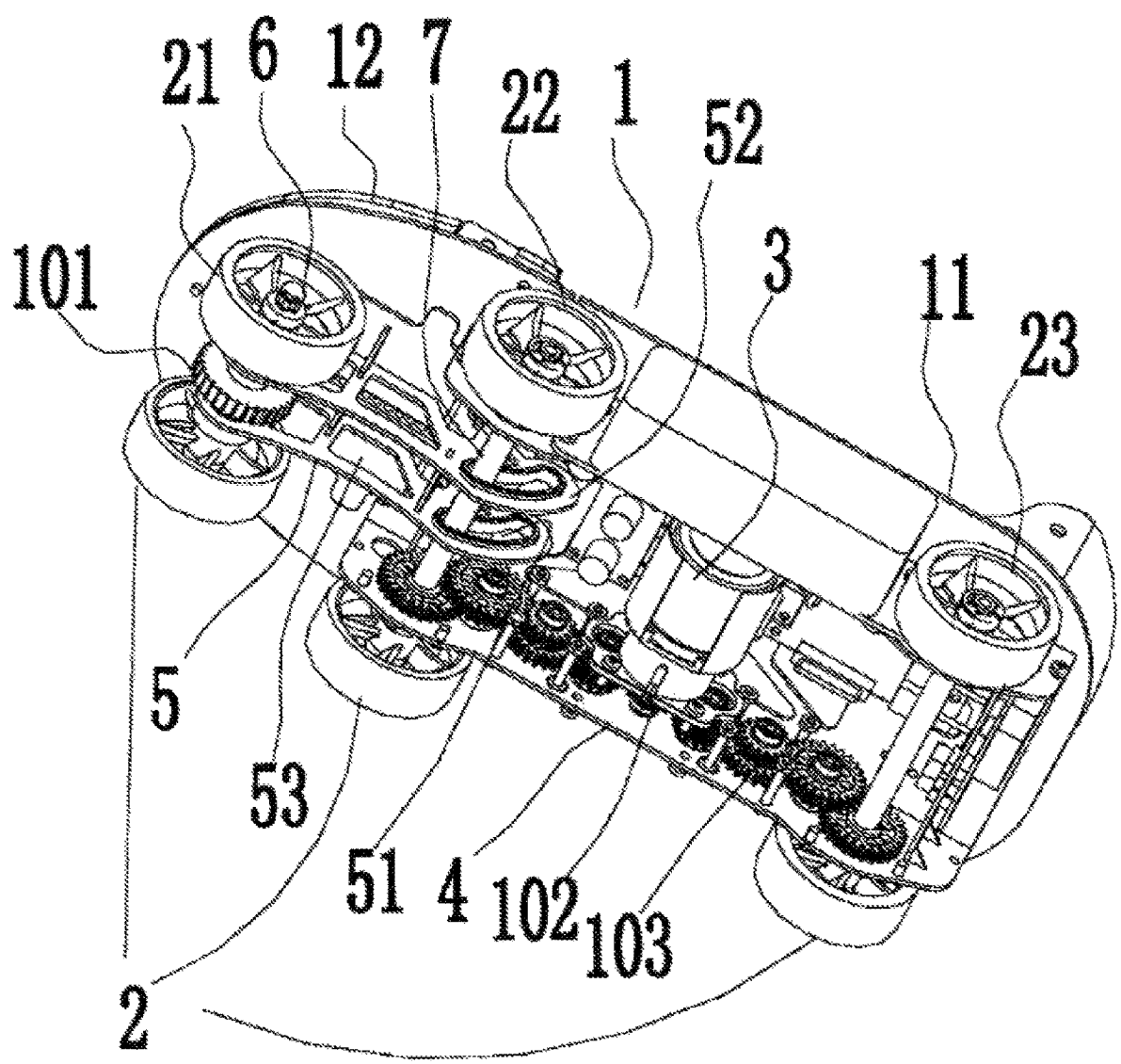
FIG. 1 is a schematic diagram of a structure of the embodiment of the present application.
Figure 2:
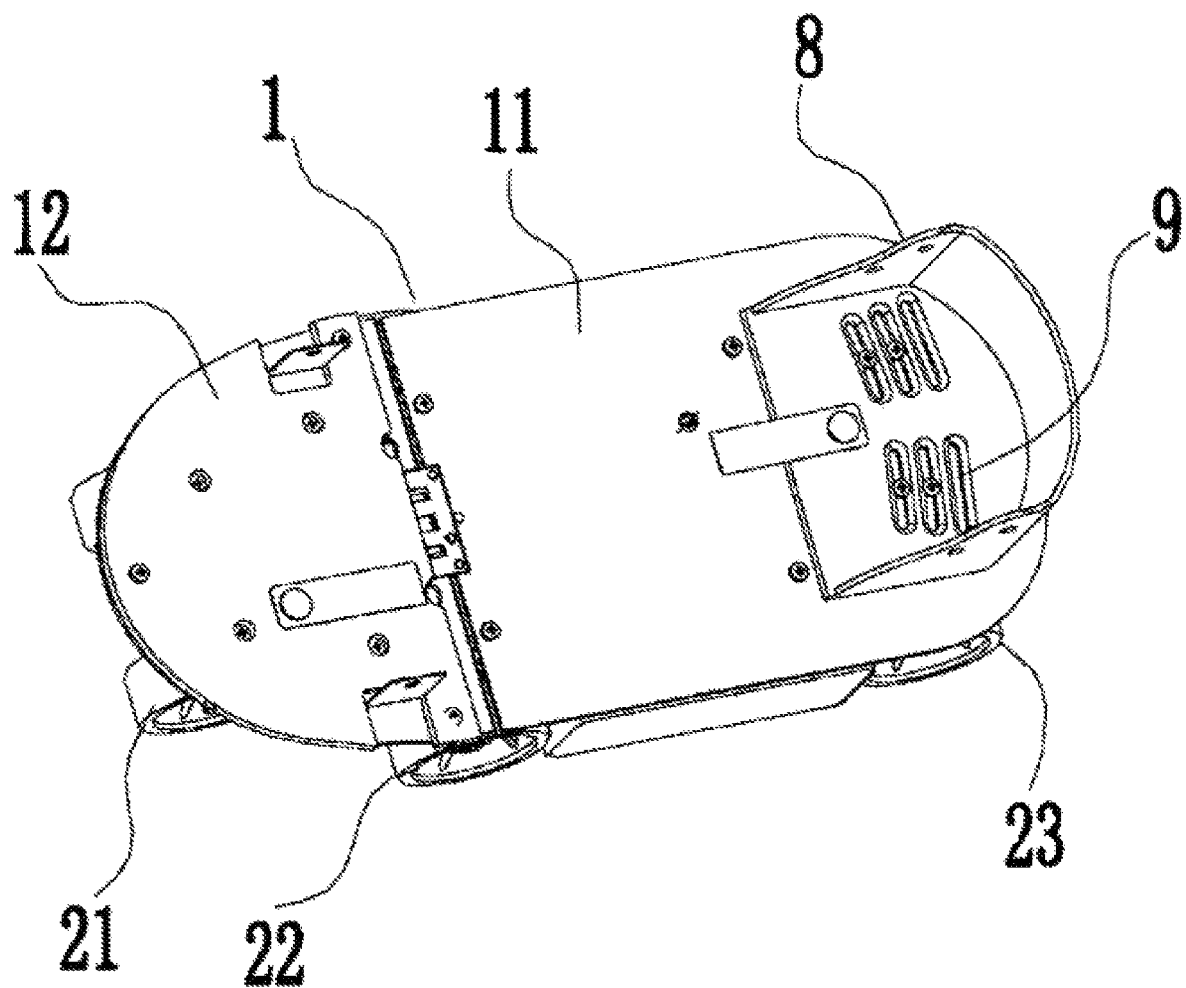
FIG. 2 is a schematic diagram of a structure of a vamp of the embodiment of the present application.

With reference to FIG. 1, bionic electric power shoes are provided, each of which includes a shoe sole 1. A plurality of rotating wheels 2 are disposed below the shoe sole 1; a motor 3 is further disposed at the lower part of the shoe sole 1; the output end of the motor 3 is connected with a transmission device which is in driving connection with the rotating wheels 2. Each bionic electric power shoe is characterized in that the shoe sole 1 consists of a shoe heel part 11 and a shoe forefoot part 12. The shoe heel part 11 and the shoe forefoot part 12 are in rotatable connection with each other. A foot fixing structure 8 is disposed on the upper side surface of the shoe heel part 11, and is used for fixing the position of a foot of a user on the shoe sole 1. The foot fixing structure 8 is provided with an angle adjustment mechanism 9 for adjusting an angle between the foot fixing structure 8 and the lengthwise direction of the shoe sole 1, so that a user can still keep the two shoe soles of the power shoes and the rotating wheels in parallel states even when standing on the shoe soles in his/her own habitual way, toe in or toe out of the two feet.

First rotating wheel racks 4 are disposed on two sides below the shoe heel part 11; two middle wheels 22 and two rear wheels 23 are respectively disposed at the front and rear parts of the first rotating wheel racks 4; the wheel tread of the rear wheels 23 is less than that of the middle wheels 22; the middle wheels 22 and the rear wheels 23 are both connected with the output end of the motor 3 through the transmission device; the middle wheels 22 are located below a boundary position between the shoe heel part 11 and the shoe forefoot part 12; second rotating wheel racks 5 are disposed below the shoe forefoot part 12; and two front wheels 21 are arranged on the second rotating wheel racks 5. The motor 3 is located between the first rotating wheel racks 4. A power supply is fixed on the outer side surface of one of the first rotating wheel racks 4, and is electrically connected with the motor 2.

The second rotating wheel racks 5 extend towards the middle wheels 22 to form connection parts 52, on which arc-shaped holes 51 are formed. The middle wheels 22 are disposed on the first rotating wheel racks 4 through a first rotating shaft 7 which penetrates through the arc-shaped holes 51. When the shoe heel part 11 and the shoe forefoot part 12 rotate relatively, the first rotating shaft 7 moves along the arc-shaped holes 51. The edges of the arc-shaped holes 51 outwards extend to enable the depths of the arc-shaped holes 51 to be greater than the thicknesses of the connection parts, and a plurality of holes 53 are formed in the connection parts 52.

The front wheels 21 are connected with an inversion prevention mechanism for preventing the front wheels from being inverted. The inversion prevention mechanism includes a second rotating shaft 6 connected with the front wheels 21, a ratchet wheel 101 fixed on the second rotating shaft 6, and a pawl matched with the ratchet wheel 101.

In this embodiment, the transmission device includes a driving wheel 102 and multiple stages of speed reduction structures. The multiple stages of speed reduction structures are disposed on the first rotating wheel racks 4 along the lengthwise direction of the shoe sole 1. The transmission device further includes a planetary speed reducer which is connected with the motor 3. In this embodiment, the multiple stages of speed reduction structures are speed reduction gear sets 104 which are all mounted on the inner side surfaces of the first rotating wheel racks 4, and gears in the speed reduction gear sets 103 are located on the same straight line.

The speed reduction gear sets in the above-mentioned solution also can be replaced by synchronous belt wheels.

The invention claimed is:

1. Electric power shoes, each of which comprises
   a shoe sole, characterized in that a plurality of rotating wheels are disposed below the shoe sole;
   a motor is further disposed at a lower part of the shoe sole;
   wherein an output end of the motor is connected with a transmission device which is in driving connection with the rotating wheels;
   wherein the shoe sole comprises two individual components, wherein the two individual components comprise a shoe heel part and a shoe forefoot part; and
   wherein the shoe heel part and the shoe forefoot part are in rotatable connection with each other.

2. The electric power shoes according to claim 1, characterized in that first rotating wheel racks are disposed on two sides below the shoe heel part; two middle wheels and two rear wheels are respectively disposed at the front and rear parts of the first rotating wheel racks; the middle wheels are located directly below the gap between the shoe heel part and the shoe forefoot part; second rotating wheel racks are disposed below the shoe forefoot part; and two front wheels are arranged on the second rotating wheel racks.

3. The electric power shoes according to claim 2, characterized in that the second rotating wheel racks extend towards the middle wheels to form connection parts, on which arc-shaped slot holes are formed; the middle wheels are disposed on the first rotating wheel racks through the first rotating shaft which penetrates through the arc-shaped slot holes; and when the shoe heel part and the shoe forefoot part rotate relatively, the first rotating shaft moves along the arc-shaped holes.

4. The electric power shoes according to claim 3, characterized in that the edges of the arc-shaped holes outwards extend to enable the depths of the arc-shaped holes to be greater than the thicknesses of the connection parts.

5. The electric power shoes according to claim 4, characterized in that a plurality of holes are formed in the connection parts.

6. The electric power shoes according to claim 2, characterized in that the wheel tread of the rear wheels is less than that of the middle wheels.

7. The electric power shoes according to claim 2, characterized in that the middle wheels and the rear wheels are both connected with the output end of the motor through the transmission device.

\* \* \* \* \*